(12) United States Patent
Bahk et al.

(10) Patent No.: US 12,540,663 B1
(45) Date of Patent: Feb. 3, 2026

(54) VEHICLE DIFFERENTIAL AND WELDING

(71) Applicant: GM GLOBAL TECHNOLOGY OPERATIONS LLC, Detroit, MI (US)

(72) Inventors: Cheonjae Bahk, Rochester, MI (US); Peng Shen, Troy, MI (US); Wenying Yang, Rochester Hills, MI (US); Kaushik Kalita, Karnataka (IN); Pankaj Kumar Jha, Troy, MI (US); Lala Ram Patel, Karnataka (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 19/008,095

(22) Filed: Jan. 2, 2025

(51) Int. Cl.
*F16H 48/38* (2012.01)
*F16H 55/06* (2006.01)
*F16H 48/40* (2012.01)

(52) U.S. Cl.
CPC .............. *F16H 48/38* (2013.01); *F16H 55/06* (2013.01); *F16H 2048/382* (2013.01); *F16H 2048/385* (2013.01); *F16H 48/40* (2013.01)

(58) Field of Classification Search
CPC ........ F16H 48/00–2048/426; F16H 2048/382; F16H 2048/385; F16H 48/40
See application file for complete search history.

(56) References Cited

U.S. PATENT DOCUMENTS

| | | | | |
|---|---|---|---|---|
| 6,589,671 | B1* | 7/2003 | Kehrer | B23K 26/28 |
| | | | | 219/121.64 |
| 8,845,475 | B2* | 9/2014 | Mayr | F16H 48/30 |
| | | | | 74/606 R |
| 9,120,184 | B2* | 9/2015 | Uchida | B23K 26/211 |
| 9,458,919 | B2* | 10/2016 | Yanase | F16H 48/40 |
| 10,160,060 | B2* | 12/2018 | Li | B23K 26/323 |
| 2007/0029290 | A1* | 2/2007 | Kehrer | B23K 26/60 |
| | | | | 219/121.64 |
| 2022/0235857 | A1 | 7/2022 | Uchida et al. | |

FOREIGN PATENT DOCUMENTS

| | | |
|---|---|---|
| AT | 003253 U1 | 12/1999 |
| CN | 116393850 A | 7/2023 |
| JP | 2019027473 A * | 2/2019 |
| WO | WO-2005030423 A1 | 4/2005 |

OTHER PUBLICATIONS

German Office Action from counterpart DE1020251054304, dated Oct. 21, 2025.

* cited by examiner

*Primary Examiner* — Sherry L Estremsky

(57) ABSTRACT

A differential for a vehicle includes: a carrier: having a radially outer surface; and being made of a first material having a first ductility; a ring gear: having a radially inner surface that abuts the radially outer surface of the carrier; and being made of a second material having a second ductility, where at least one of (a) the carrier and (b) the ring gear includes an annular groove forming a circle in a lateral surface adjacent to at least one of (a) the radially outer surface of the carrier and (b) the radially inner surface of the ring gear.

20 Claims, 8 Drawing Sheets

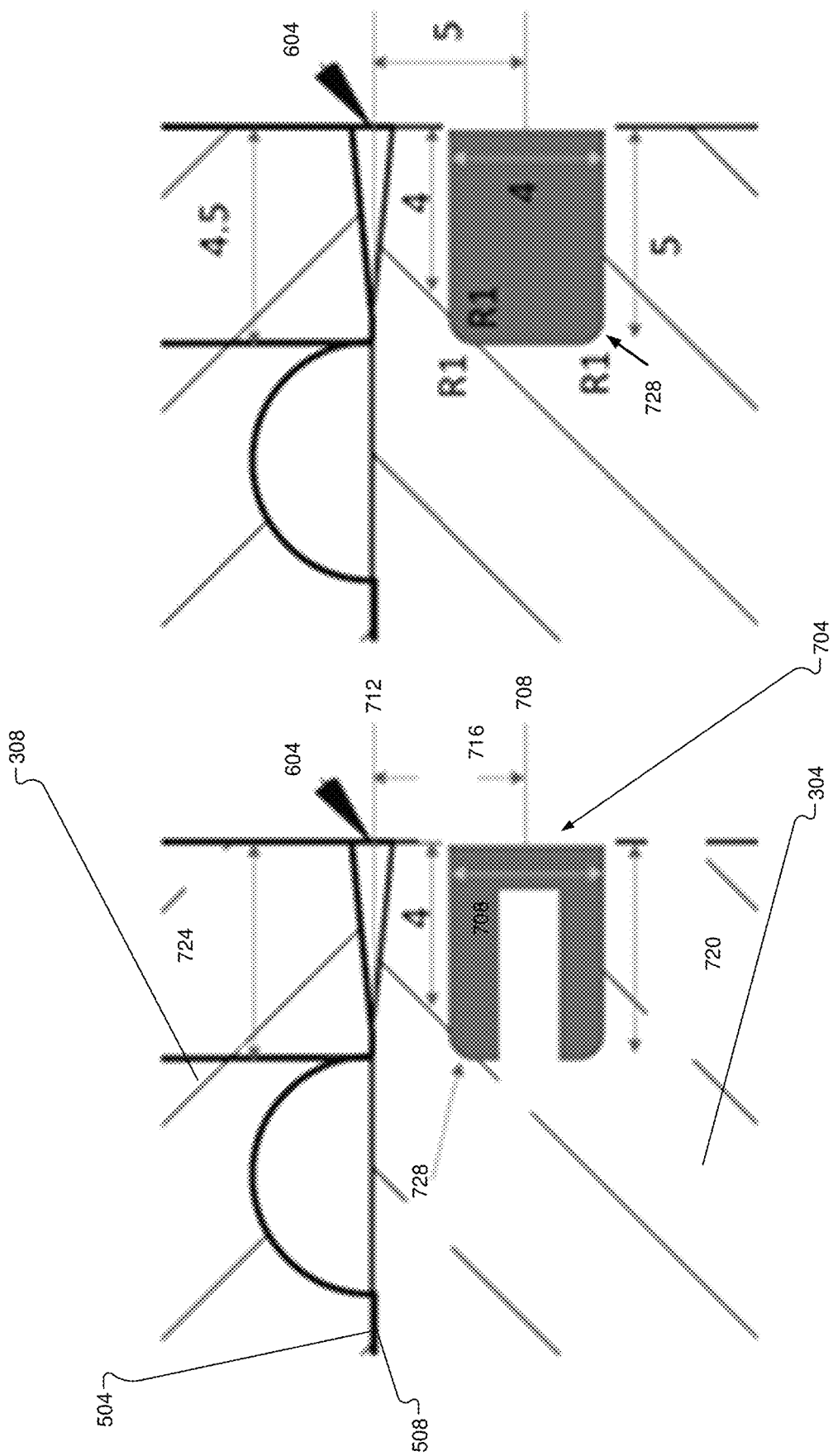

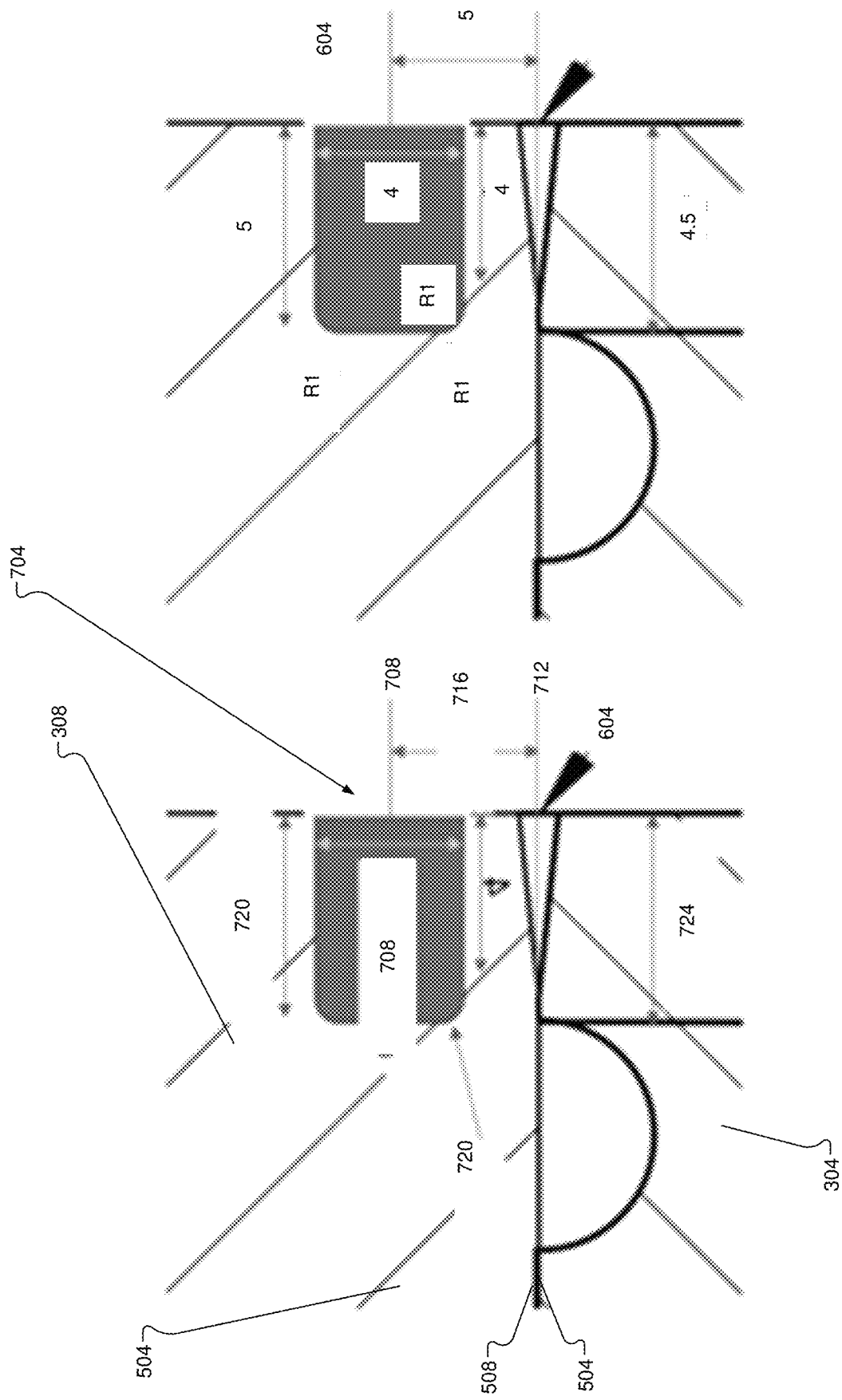

VEHICLE DIFFERENTIAL AND WELDING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to engines and more particularly to differentials of vehicles and more particularly to carriers and ring gears of differentials and their welding.

Some types of vehicles include only an internal combustion engine that generates propulsion torque. Hybrid vehicles include both an internal combustion engine and one or more electric motors. Some types of hybrid vehicles utilize the electric motor and the internal combustion engine in an effort to achieve greater fuel efficiency than if only the internal combustion engine was used. Some types of hybrid vehicles utilize the electric motor and the internal combustion engine to achieve greater torque output than the internal combustion could achieve by itself.

Some example types of hybrid vehicles include parallel hybrid vehicles, series hybrid vehicles, and other types of hybrid vehicles. In a parallel hybrid vehicle, the electric motor works in parallel with the engine to combine power and range advantages of the engine with efficiency and regenerative braking advantages of electric motors. In a series hybrid vehicle, the engine drives a generator to produce electricity for the electric motor, and the electric motor drives a transmission. This allows the electric motor to assume some of the power responsibilities of the engine, which may permit the use of a smaller and possibly more efficient engine. The present application is applicable to electric vehicles, hybrid vehicles, and other types of vehicles.

SUMMARY

In a feature, a differential for a vehicle includes: a carrier: having a radially outer surface; and being made of a first material having a first ductility; a ring gear: having a radially inner surface that abuts the radially outer surface of the carrier; and being made of a second material having a second ductility, where at least one of (a) the carrier and (b) the ring gear includes an annular groove forming a circle in a lateral surface adjacent to at least one of (a) the radially outer surface of the carrier and (b) the radially inner surface of the ring gear.

In further features, the second ductility is less than the first ductility.

In further features, the ring gear includes the annular groove.

In further features, both the ring gear and the carrier include the annular groove.

In further features, the carrier includes the annular groove.

In further features, the first material is iron.

In further features, the second material is a steel.

In further features, the ring gear and the carrier are welded in a circle where the radially inner surface of the ring gear meets the radially outer surface of the carrier.

In further features, the ring gear and the carrier are laser welded.

In further features, at least one characteristic of the annular groove corresponds to a depth of the weld.

In further features, a second depth of the annular groove relative to the lateral surface is greater than the depth of the weld.

In further features, the depth of the weld is approximately 4.5 millimeters.

In further features, a distance between a first center of the weld and a second center of the annular groove in a direction parallel to the lateral surface is greater than a depth of the weld.

In further features, the distance is approximately 5 millimeters.

In further features, a width of the annular groove in a direction parallel to the lateral surface is approximately 4 millimeters.

In further features, at least one corner of the annular groove is rounded.

In further features, the at least one corner has a radius of approximately 1 millimeter.

In further features, radially inner and outer corners of the annular groove are rounded.

In further features, at least one corner of the annular groove is square.

In a feature, a differential for a vehicle includes: a carrier: having a radially outer surface; and being made of a first material having a first ductility; a ring gear: having a radially inner surface that abuts the radially outer surface of the carrier; and being made of a second material having a second ductility, where at least one of (a) the carrier and (b) the ring gear includes an annular grove forming a circle in a lateral surface adjacent to at least one of (a) the radially outer surface of the carrier and (b) the radially inner surface of the ring gear, where the second ductility is less than the first ductility, where the first material is iron, where the second material is a steel, where the ring gear and the carrier are welded in a circle where the radially inner surface of the ring gear meets the radially outer surface of the carrier, where at least one characteristic of the annular groove corresponds to a depth of the weld, where a first depth of the annular groove relative to the lateral surface is greater than a second depth of the weld, and where a distance between a first center of the weld and a second center of the annular groove in a direction parallel to the lateral surface is greater than the second depth of the weld.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 7 includes a cross-sectional view of an example implementation of the ring gear and the carrier gear with the carrier gear including a groove.

FIG. 8 includes the cross-sectional view of the example of FIG. 7 with example dimensions for the groove;

FIGS. 9 and 10 include example illustration of the ring gear including the groove.

In the drawings, reference numbers may be reused to identify similar and/or identical elements.

DETAILED DESCRIPTION

A vehicle may include one or more electric propulsion motors. The vehicle may additionally or alternatively include an internal combustion engine. A differential (or drive unit (DU)) receives torque output from a torque producer (e.g., engine and/or electric propulsion motor) and outputs torque to two or more wheels.

The differential includes a carrier and a ring gear that is welded to the carrier. The carrier may be made of a more ductile material than the ring gear, such as of a ductile iron. The ring gear may be made of a less ductile material than the carrier, such as a steel. The carrier and the ring gear are welded 360 degrees around the carrier/ring gear, such as using laser welding. One or more cracks, however, may form in the more ductile carrier. For example, the weld joint may cool down relatively quickly and introduce microstructural phase transition and thermal contraction, which may cause high residual stress. The residual stress may cause crack formation and propagation, which may result in a weakened weld joint and possible early failure of the differential.

The present application involves the carrier and/or the ring gear having a 360 degree groove at an interface where the carrier and the ring gear are welded together. The groove(s) and specific measurements and parameters of the groove(s) minimize the risk and prevent the items noted above by partially relieving the residual stress by gently and controllingly controlling the elastic and/or plastic deformation around the weld joint.

Figure 1:
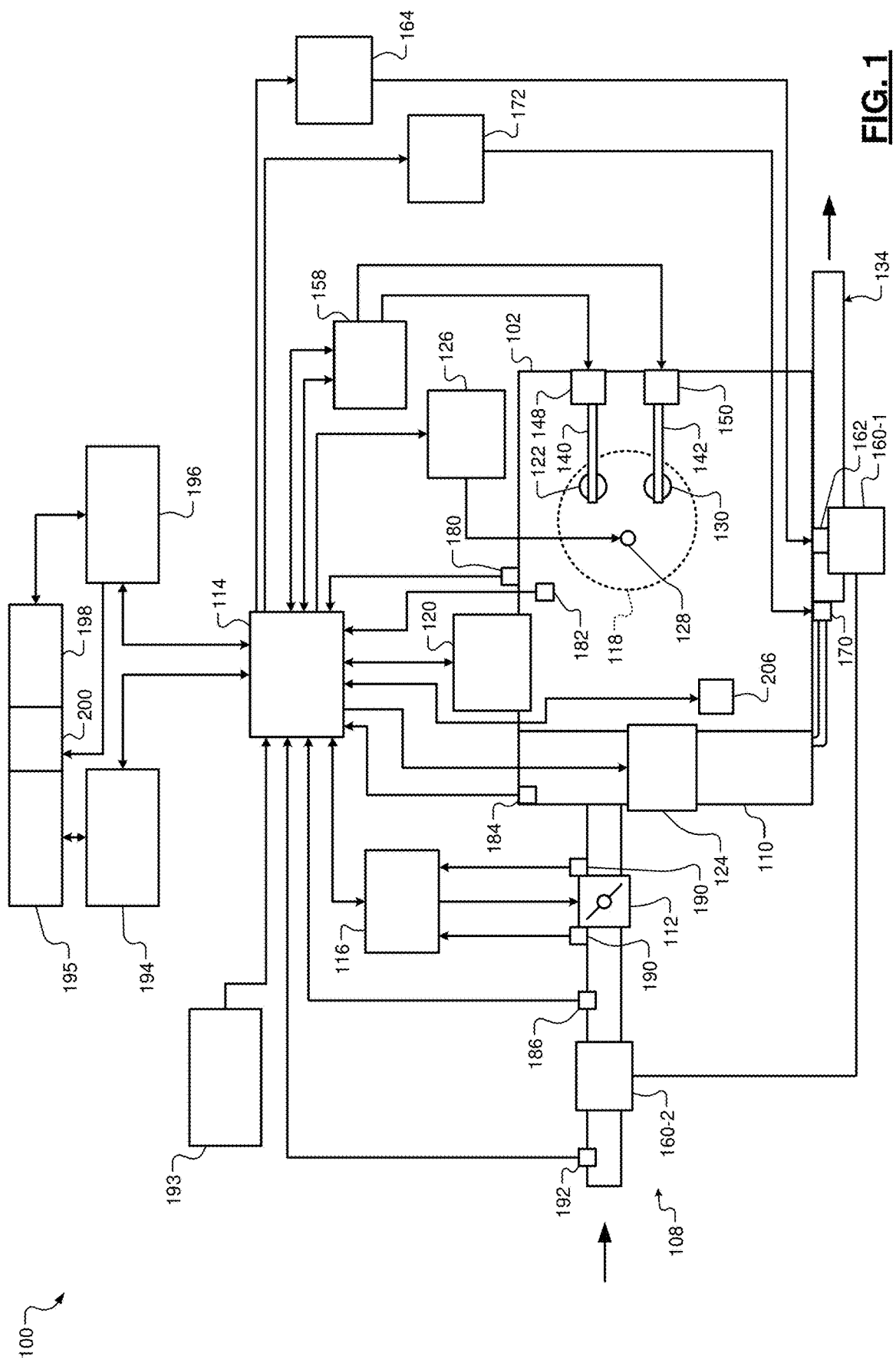
FIG. 1 is a functional block diagram of an example engine control system.

Referring now to FIG. 1, a functional block diagram of an example powertrain system 100 is presented for a hybrid vehicle. While the example of a hybrid vehicle is provided, the present application is applicable to non-vehicle applications that include a battery and other types of vehicles (e.g., electric, internal combustion engine, etc.).

The powertrain system 100 of a vehicle may include an engine 102 that combusts an air/fuel mixture to produce torque. The vehicle may be non-autonomous or autonomous. Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, which may improve fuel efficiency.

The engine 102 may operate using a four-stroke cycle or another suitable engine cycle. The four strokes of a four-stroke cycle, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may disable provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time when the piston returns to a bottom most position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft-based valve actuation is shown and has been discussed, camless valve actuators may be implemented. While separate intake and exhaust camshafts are shown, one camshaft having lobes for both the intake and exhaust valves may be used.

The cylinder actuator module 120 may deactivate the cylinder 118 by disabling opening of the intake valve 122 and/or the exhaust valve 130. The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. In various implementations, cam phasing may be omitted. Variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine 102 may include zero, one, or more than one boost device that provides pressurized air to the intake manifold 110. For example, FIG. 1 shows a turbocharger including a turbocharger turbine 160-1 that is driven by exhaust gases flowing through the exhaust system 134. A supercharger is another type of boost device.

The turbocharger also includes a turbocharger compressor 160-2 that is driven by the turbocharger turbine 160-1 and that compresses air leading into the throttle valve 112. A wastegate (WG) 162 controls exhaust flow through and bypassing the turbocharger turbine 160-1. Wastegates can also be referred to as (turbocharger) turbine bypass valves. The wastegate 162 may allow exhaust to bypass the turbocharger turbine 160-1 to reduce intake air compression provided by the turbocharger. The ECM 114 may control the turbocharger via a wastegate actuator module 164. The wastegate actuator module 164 may modulate the boost of the turbocharger by controlling an opening of the wastegate 162.

A cooler (e.g., a charge air cooler or an intercooler) may dissipate some of the heat contained in the compressed air charge, which may be generated as the air is compressed. Although shown separated for purposes of illustration, the turbocharger turbine 160-1 and the turbocharger compressor 160-2 may be mechanically linked to each other, placing intake air in close proximity to hot exhaust. The compressed air charge may absorb heat from components of the exhaust system 134.

The engine 102 may include an exhaust gas recirculation (EGR) valve 170, which selectively redirects exhaust gas back to the intake manifold 110. The EGR valve 170 may receive exhaust gas from upstream of the turbocharger turbine 160-1 in the exhaust system 134. The EGR valve 170 may be controlled by an EGR actuator module 172.

Crankshaft position may be measured using a crankshaft position sensor 180. An engine speed may be determined based on the crankshaft position measured using the crankshaft position sensor 180, such as based on a change in the crankshaft period over time. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. One or more other sensors 193 may also be implemented. The other sensors 193 include an accelerator pedal position (APP) sensor, a brake pedal position (BPP) sensor, may include a clutch pedal position (CPP) sensor (e.g., in the case of a manual transmission), and may include one or more other types of sensors. An APP sensor measures a position of an accelerator pedal within a passenger cabin of the vehicle. A BPP sensor measures a position of a brake pedal within a passenger cabin of the vehicle. A CPP sensor measures a position of a clutch pedal within the passenger cabin of the vehicle. The other sensors 193 may also include one or more acceleration sensors that measure longitudinal (e.g., fore/aft) acceleration of the vehicle and latitudinal acceleration of the vehicle. An accelerometer is an example type of acceleration sensor, although other types of acceleration sensors may be used. The ECM 114 may use signals from the sensors to make control decisions for the engine 102.

The ECM 114 may communicate with a transmission control module 194, which controls operation of a transmission 195. The ECM 114 may communicate with a hybrid control module 196, for example, to coordinate operation of the engine 102 and an electric motor 198. While the example of one electric motor is provided, multiple electric motors may be implemented. In various implementations, various functions of the ECM 114, the transmission control module 194, and the hybrid control module 196 may be integrated into one or more modules.

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the wastegate actuator module 164, and the EGR actuator module 172. For these engine actuators, the actuator values may correspond to a cylinder activation/deactivation sequence, fueling rate, intake and exhaust cam phaser angles, target wastegate opening, and EGR valve opening, respectively.

The ECM 114 may control the actuator values in order to cause the engine 102 to output torque based on a torque request. The ECM 114 may determine the torque request, for example, based on one or more driver inputs, such as an APP, a BPP, a CPP, and/or one or more other suitable driver inputs. The ECM 114 may determine the torque request, for example, using one or more functions or lookup tables that relate the driver input(s) to torque requests.

Under some circumstances, the hybrid control module 196 controls the electric motor 198 to output torque, for example, to supplement engine torque output. The hybrid control module 196 may also control the electric motor 198 to output torque for vehicle propulsion at times when the engine 102 is shut down.

The hybrid control module 196 applies electrical power from a battery to the electric motor 198 to cause the electric motor 198 to output positive torque. The electric motor 198 may output torque, for example, to an input shaft of the transmission 195, to an output shaft of the transmission 195, or to another component. A clutch 200 may be implemented to couple the electric motor 198 to the transmission 195 and to decouple the electric motor 198 from the transmission 195. One or more gearing devices may be implemented between an output of the electric motor 198 and an input of the transmission 195 to provide one or more predetermined gear ratios between rotation of the electric motor 198 and rotation of the input of the transmission 195. In various implementations, the electric motor 198 may be omitted.

Figure 2:
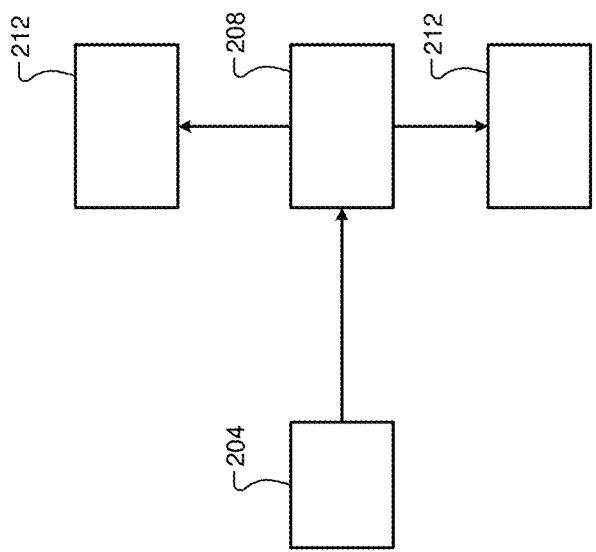
FIG. 2 is a functional block diagram of a torque transfer system of the vehicle.

FIG. 2 is a functional block diagram of a torque transfer system of the vehicle. One or more torque output devices 204, such as the engine 102 and/or one or more electric propulsion motors (e.g., 198), output torque to a differential 208 for vehicle propulsion. For example, the torque output devices 204 may drive rotation of an input shaft to the differential 208. The differential 208 may also be referred to as a drive unit (DU).

The differential 208 transfers input torque (from the input shaft) to two or more different wheels 212 (via two or more output shafts). The wheels 212 may be, for example, front wheels of the vehicle or rear wheels of the vehicle. The differential 208 includes a carrier and a ring gear that is coupled to the carrier, as discussed further below.

Figure 3:
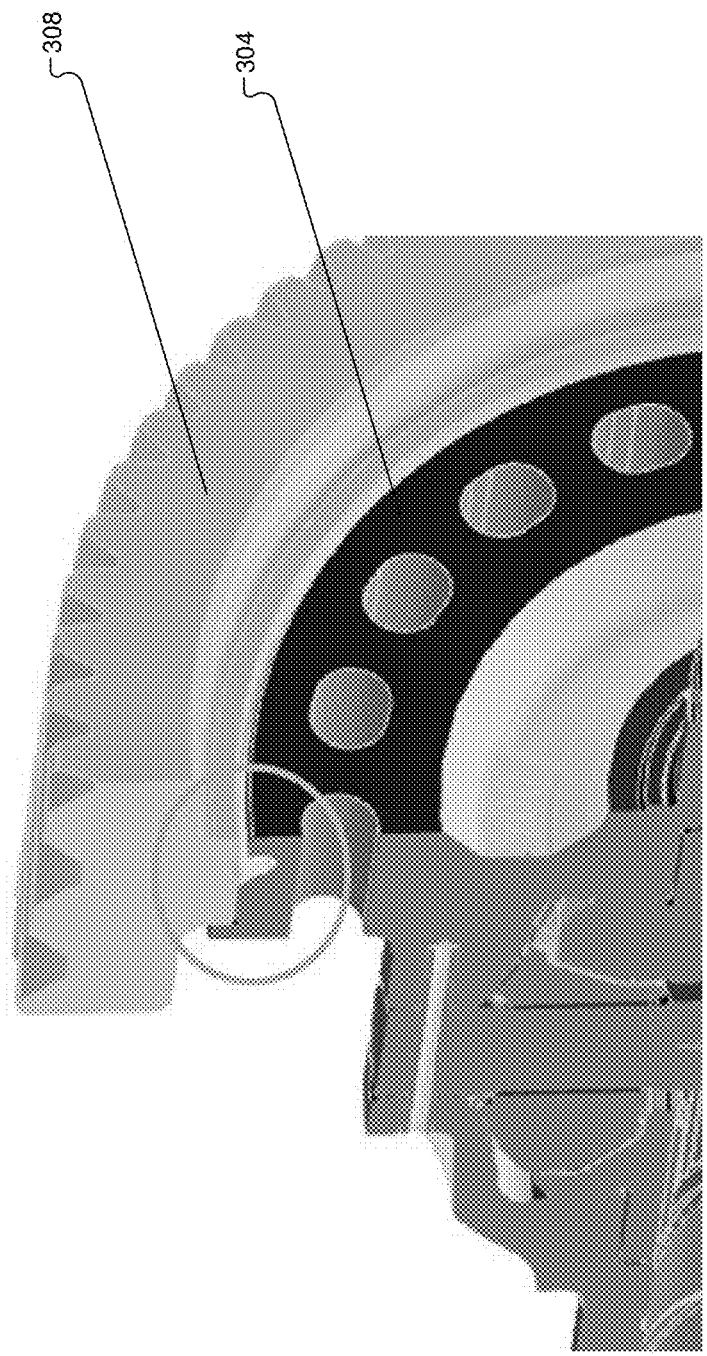
FIG. 3 is a perspective view of an example portion of a differential.
Figure 4:
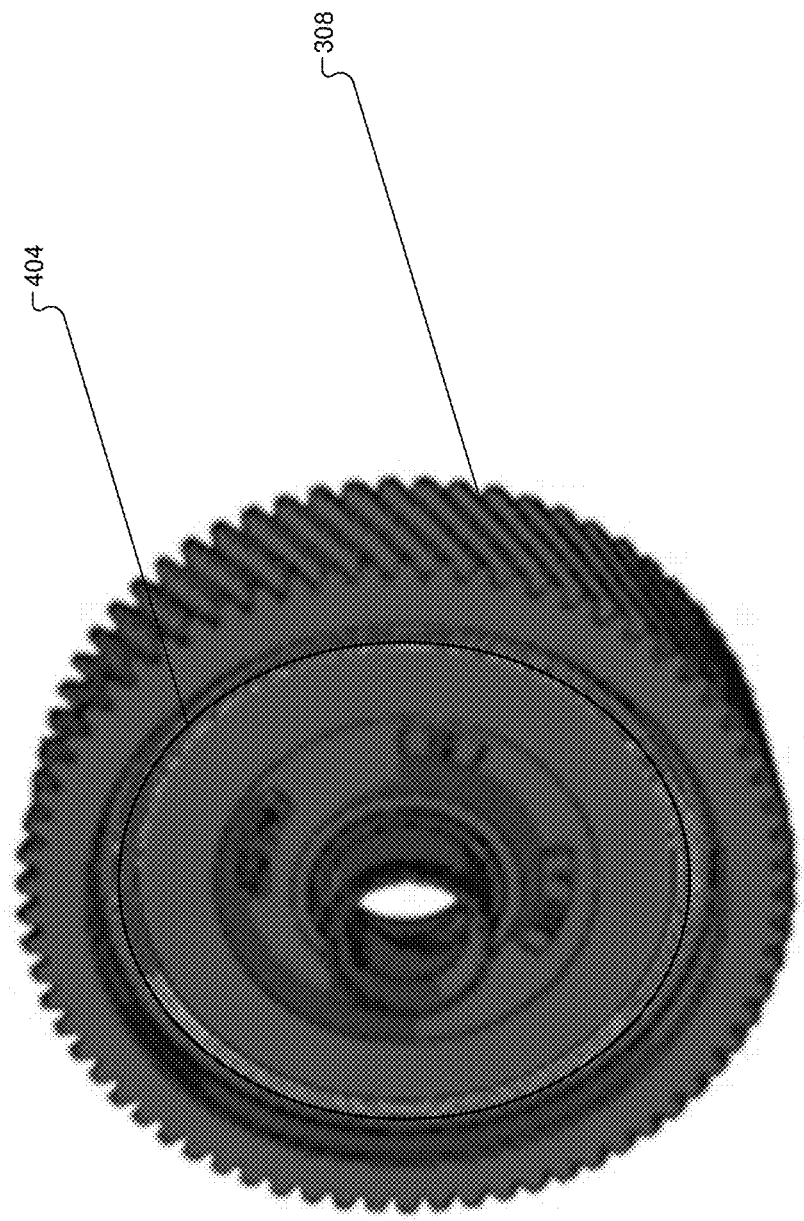
FIG. 4 is a perspective view of a ring gear including an example 360 degree interface.

FIG. 3 is a perspective view of an example portion of the differential 208. The differential 208 includes a carrier 304 and a ring gear 308. FIG. 4 is a perspective view of the ring gear 308.

The carrier 304 may be made of a material having a first ductility, and the ring gear 308 may be made of a material having a second ductility. The first ductility may be more ductile than the second ductility. For example, the carrier 304 may be made of iron, and the ring gear 308 may be made of a steel.

The carrier 304 and the ring gear 308 are welded together, such as using laser welding. The carrier 304 and the ring gear 308 are welded along a 360 degree interface where the carrier 304 contacts the ring gear 308 (360 degrees around surfaces of the carrier 304 and the ring gear 308). An example 360 degree interface is illustrated by 404 in FIG. 4 which includes a perspective view of the ring gear 308.

Figure 5:
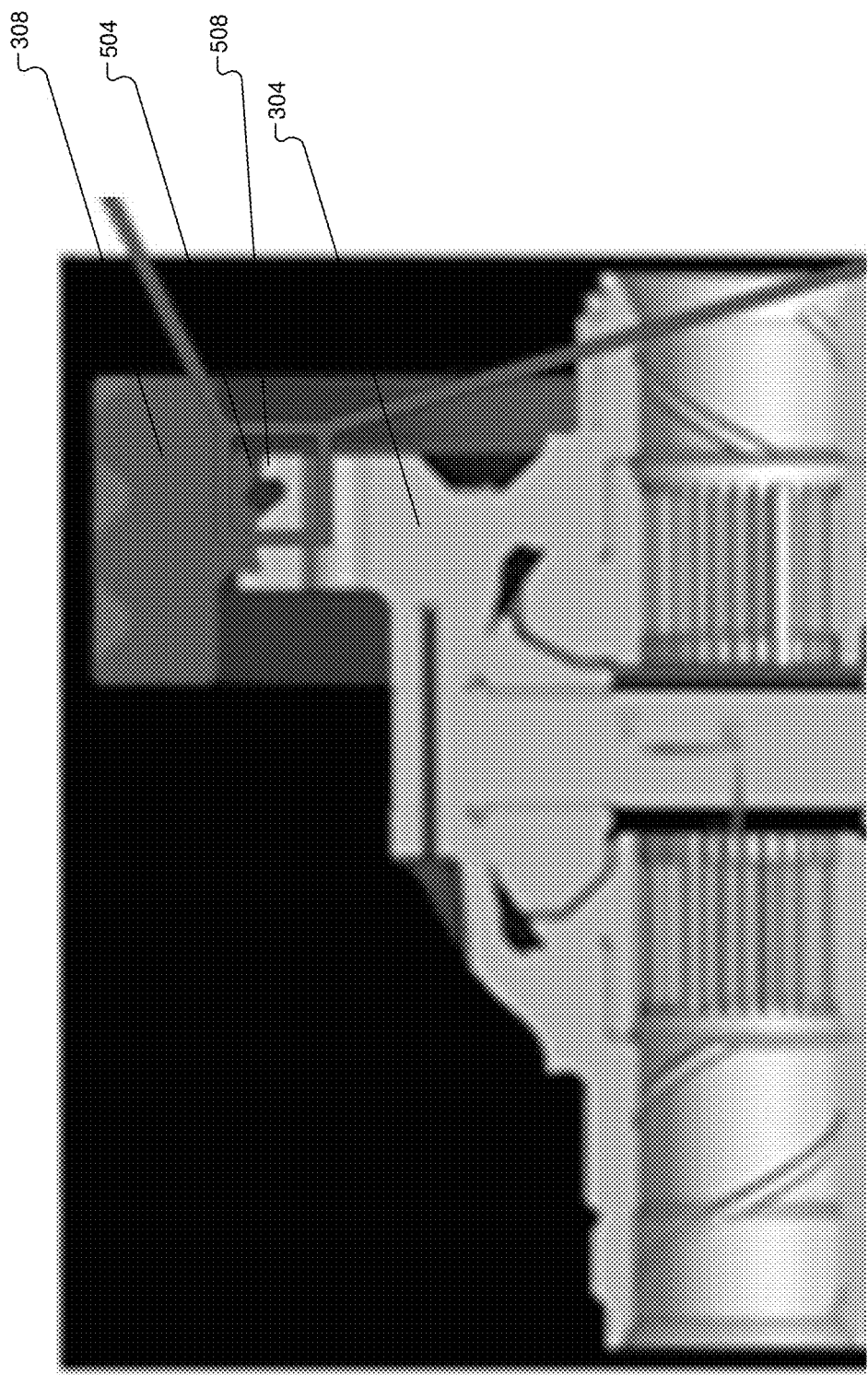
FIG. 5 includes an example cross-sectional view including a carrier and a ring gear.

FIG. 5 includes an example cross-sectional view including the carrier 304 and the ring gear 308. A first radially inner surface 504 of the ring gear 308 contacts and is welded to a second radially outer surface 508 of the carrier 304, such as by laser welding. The first radially inner surface 504 and the second radially outer surface are cylindrical in the example shown. While the example of cylindrical radially inner and outer surface is provided, the present application is also applicable to welding side surfaces of the carrier 304 and the ring gear 308.

Figure 6:
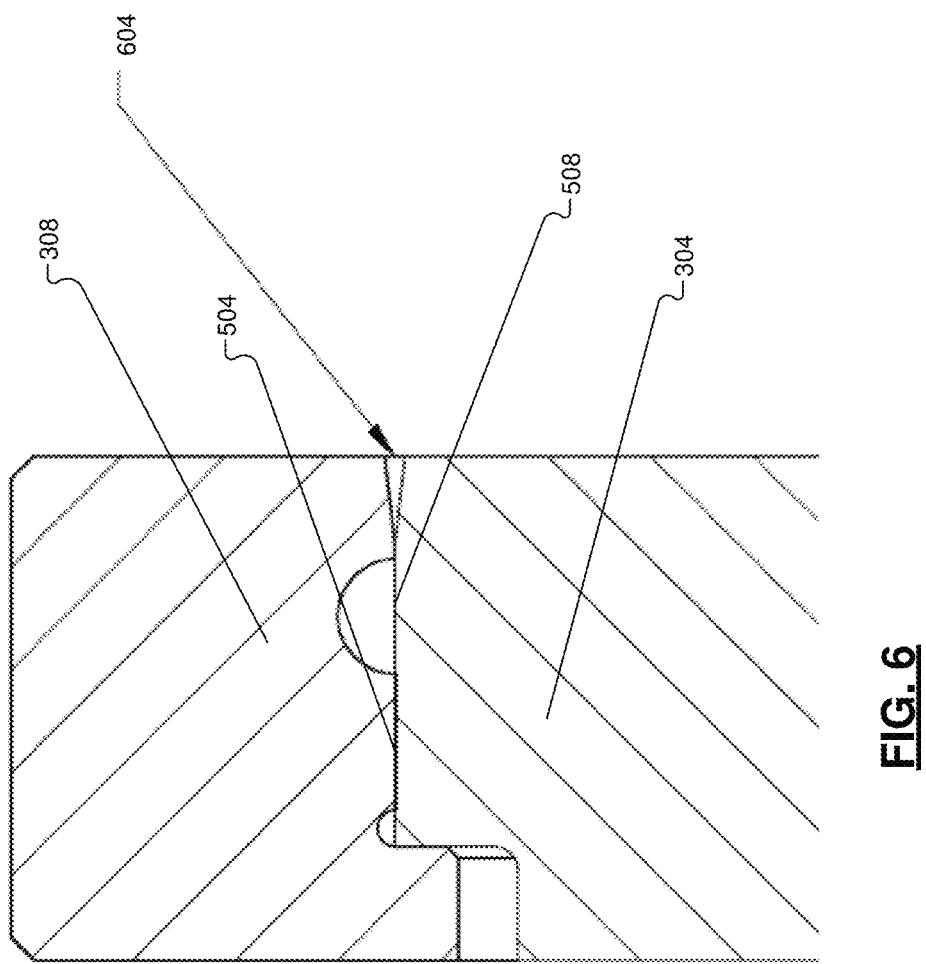
FIG. 6 includes a cross-sectional view of an example of the carrier welded to the ring gear.

FIG. 6 includes a cross-sectional view of an example the carrier 304 welded to the ring gear 308. Laser welding of a predetermined depth (e.g., approximately 4.5 millimeters (mm)) is illustrated by 604. While an example weld depth is provided, the present application is also applicable to other weld depths.

As illustrated in FIG. 6, neither the carrier 304 nor the ring gear 308 include a groove formed on a lateral surface adjacent to the weld 604. As described above, the carrier 304 may be made of a more ductile material than the ring gear 308, such as of a ductile iron. The ring gear 308 may be made of a less ductile material than the carrier 304, such as a steel.

One or more cracks, however, may form in the more ductile carrier 304 from the welding. For example, the weld joint may cool down relatively quickly and introduce microstructural phase transition and thermal contraction, which may cause high residual stress. The residual stress may cause crack formation and propagation, which may result in a weakened weld joint and possible early failure of the differential.

The present application involves the carrier 304 and/or the ring gear 308 having a 360 degree (annular) groove adjacent to the weld. The groove(s) and specific measurements and parameters of the groove(s) minimize the risk and prevent the items noted above by partially relieving the residual stress by gently and controllingly controlling the elastic and/or plastic deformation around the weld joint.

FIG. 7 includes a cross-sectional view of an example implementation of the ring gear 308 and the carrier gear 304 with the carrier gear 304 including a groove 704. FIG. 8 includes the cross-sectional view of the example of FIG. 7 with example dimensions for the groove 704. The groove 704 is annular and forms a circle around the entire lateral side of the carrier gear 304. The center of the circle is disposed on an axis of the carrier 304 and the ring gear 308.

The groove 704 has a groove width 708, such as approximately 4 mm. A center 708 of the grove 704 and a center 712 of the weld 604 are disposed a groove distance 716 apart. The groove distance 716 may be, for example, approximately 5 mm in the example of the groove width 708 being approximately 4 mm.

The groove 704 has a groove depth 720. The groove depth 720 may be greater than a depth 724 of the weld 604. For example, the groove depth 720 may be approximately 5 mm in the example of the depth 724 of the weld 604 being approximately 4.5 mm.

Inner corners of the groove 704 such as 728 may be rounded or square. FIGS. 7 and 8 illustrate rounded corners. The corners may have a radius of, for example, approximately 1 mm (R1).

The dimensions provided minimize the risk and prevent the items noted above by partially relieving the residual stress by gently and controllingly controlling the elastic and/or plastic deformation around the weld joint 604. The groove(s) allow for the use of different materials for the carrier and the ring gear without cracking, which allows for a mass and price decrease relative to the carrier having the same material as the ring gear. The groove may also enable the welding without a pre-heating process, which may decrease production time and reduce manufacturing cost.

While FIGS. 7 and 8 illustrate the groove 704 in the carrier 304, additionally or alternatively the ring gear 308 may include the groove 704. The groove 704 may have the same measurements and features as the groove 704 in the carrier 304. FIGS. 9 and 10 include example illustration of the ring gear 308 including the groove 704. Dimensions illustrated in FIGS. 7-10 are in millimeters. Approximately as used herein may mean the stated measurement +/−10%. The top corner 720 in FIGS. 7-8 is the radially outer corner, and the lower corner 720 in FIGS. 7-8 is the radially inner corner. In various implementations, one corner may be square while the other corner is rounded.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP:

Hypertext Preprocessor), Scala, Eiffel, Smalltalk, Erlang, Ruby, Flash®, Visual Basic®, Lua, MATLAB, SIMULINK, and Python®.

What is claimed is:

1. A differential for a vehicle, comprising:
a carrier:
   having a radially outer surface; and
   being made of a first material having a first ductility;
a ring gear:
   having a radially inner surface that abuts the radially outer surface of the carrier; and
   being made of a second material having a second ductility,
wherein at least one of (a) the carrier and (b) the ring gear includes an annular groove forming a circle in a lateral surface adjacent to at least one of (a) the radially outer surface of the carrier and (b) the radially inner surface of the ring gear,
wherein at least one corner of the annular groove is rounded, and
wherein the at least one corner has a radius of approximately 1 millimeter.

2. The differential of claim 1 wherein the second ductility is less than the first ductility.

3. The differential of claim 1 wherein the ring gear includes the annular groove.

4. The differential of claim 1 wherein both the ring gear and the carrier include the annular groove.

5. The differential of claim 1 wherein the carrier includes the annular groove.

6. The differential of claim 1 wherein the first material is iron.

7. The differential of claim 1 wherein the second material is a steel.

8. The differential of claim 1 wherein the ring gear and the carrier are welded in a circle where the radially inner surface of the ring gear meets the radially outer surface of the carrier.

9. The differential of claim 8 wherein the ring gear and the carrier are laser welded.

10. The differential of claim 8 wherein at least one characteristic of the annular groove corresponds to a depth of the weld.

11. The differential of claim 10 wherein a second depth of the annular groove relative to the lateral surface is greater than the depth of the weld.

12. The differential of claim 10 wherein the depth of the weld is approximately 4.5 millimeters.

13. The differential of claim 8 wherein a distance between a first center of the weld and a second center of the annular groove in a direction parallel to the lateral surface is greater than a depth of the weld.

14. The differential of claim 13 wherein the distance is approximately 5 millimeters.

15. The differential of claim 1 wherein a width of the annular groove in a direction parallel to the lateral surface is approximately 4 millimeters.

16. The differential of claim 1 wherein radially inner and outer corners of the annular groove are rounded.

17. The differential of claim 1 wherein at least one corner of the annular groove is square.

18. A differential for a vehicle, comprising:
a carrier:
   having a radially outer surface; and
   being made of a first material having a first ductility;
a ring gear:
   having a radially inner surface that abuts the radially outer surface of the carrier; and
   being made of a second material having a second ductility,
wherein at least one of (a) the carrier and (b) the ring gear includes an annular groove forming a circle in a lateral surface adjacent to at least one of (a) the radially outer surface of the carrier and (b) the radially inner surface of the ring gear,
wherein the ring gear and the carrier are welded in a circle where the radially inner surface of the ring gear meets the radially outer surface of the carrier,
wherein a distance between a first center of the weld and a second center of the annular groove in a direction parallel to the lateral surface is greater than a depth of the weld, and
wherein the distance is approximately 5 millimeters.

19. A differential for a vehicle, comprising:
a carrier:
   having a radially outer surface; and
   being made of a first material having a first ductility;
a ring gear:
   having a radially inner surface that abuts the radially outer surface of the carrier; and
   being made of a second material having a second ductility,
wherein at least one of (a) the carrier and (b) the ring gear includes an annular groove forming a circle in a lateral surface adjacent to at least one of (a) the radially outer surface of the carrier and (b) the radially inner surface of the ring gear,
wherein a width of the annular groove in a direction parallel to the lateral surface is approximately 4 millimeters.

20. The differential of claim 19, wherein:
at least one corner of the annular groove is rounded; and
the at least one corner has a radius of approximately 1 millimeter.

* * * * *